US012019402B2

(12) United States Patent
Christan et al.

(10) Patent No.: US 12,019,402 B2
(45) Date of Patent: Jun. 25, 2024

(54) WATCH COMPRISING A DIAL INCLUDING A FIXED PORTION AND A MOVABLE PORTION

(71) Applicant: ETA SA Manufacture Horlogère Suisse, Grenchen (CH)

(72) Inventors: Julien Christan, Bienne (CH); Ivan Villar, Bruegg (CH)

(73) Assignee: ETA SA Manufacture Horlogère Suisse, Grenchen (CH)

(*) Notice: Subject to any disclaimer, the term of this patent is extended or adjusted under 35 U.S.C. 154(b) by 0 days.

(21) Appl. No.: 17/804,655

(22) Filed: May 31, 2022

(65) Prior Publication Data

US 2022/0413443 A1 Dec. 29, 2022

(30) Foreign Application Priority Data

Jun. 29, 2021 (EP) .................................... 21182574

(51) Int. Cl.
*G04B 47/04* (2006.01)
*G04B 19/06* (2006.01)
*G04B 19/10* (2006.01)
*G04B 45/00* (2006.01)

(52) U.S. Cl.
CPC ......... *G04B 47/044* (2013.01); *G04B 19/065* (2013.01); *G04B 19/10* (2013.01); *G04B 45/003* (2013.01)

(58) Field of Classification Search
CPC .... G04B 47/044; G04B 19/065; G04B 19/10; G04B 45/003
See application file for complete search history.

(56) References Cited

U.S. PATENT DOCUMENTS 5,586,089 A * 12/1996 McGarvey ......... G04B 45/0007 368/233
2022/0291632 A1* 9/2022 Martel ................... G02B 27/60

FOREIGN PATENT DOCUMENTS

| | | | | |
|---|---|---|---|---|
| CH | 700 261 A2 | 7/2010 | | |
| CH | 700261 A2 * | 7/2010 | ........... G04B 19/065 | |
| CH | 700 261 B1 | 9/2013 | | |
| JP | 3044797 | 10/1997 | | |
| WO | WO 2013/187798 A1 | 12/2013 | | |

(Continued)

OTHER PUBLICATIONS

Machine-Generated Translation of CH700261A2, https://worldwide.espacenet.com/publicationDetails/biblio?DB=EPODOC&II=0&ND=3&adjacent=true&locale=en_EP&FT=D&date=20100730&CC=CH&NR=700261A2&KC=A2, Retrieved and generated on Dec. 28, 2022 (Year: 2022).*

(Continued)

*Primary Examiner* — Renee S Luebke
*Assistant Examiner* — Matthew Hwang
(74) *Attorney, Agent, or Firm* — Oblon, McClelland, Maier & Neustadt, L.L.P.

(57) ABSTRACT

A watch including a dial including a fixed portion superimposed on a portion movable in rotation including a surface on which are arranged areas with visual appearances different from each other, the fixed portion including at least one through opening emerging on at least one of the areas, the movable portion being kinematically connected to a control member so as to be rotated by actuating the control member and being configured so that when it is rotated, the areas of different visual appearance appear successively through the opening.

5 Claims, 2 Drawing Sheets

(56) References Cited

FOREIGN PATENT DOCUMENTS

WO WO 2020/183423 A1 9/2020

OTHER PUBLICATIONS

European Search Report dated Nov. 22, 2021 in European Application 21182574.0 filed on Jun. 29, 2021 (with English Translation of Categories of cited documents) 3 pages.
Japanese Notice of the Reason for Refusal dated Jul. 11, 2023, in Japanese Patent Application No. 2022-095709, 10 pages (with English Translation).
Notice of Grounds of Rejection dated Feb. 28, 2024, issued in corresponding Korean patent application No. 10-2022-0075082 (with English translation).

* cited by examiner

A-A

WATCH COMPRISING A DIAL INCLUDING A FIXED PORTION AND A MOVABLE PORTION

CROSS-REFERENCE TO RELATED APPLICATION

This application claims priority to European Patent Application No. 21182574.0 filed on Jun. 29, 2021, the entire disclosure of which is hereby incorporated herein by reference.

TECHNICAL FIELD OF THE INVENTION

The invention relates to the field of watchmaking, and in particular a watch comprising external parts.

More particularly, the invention relates to a watch comprising a dial including a fixed portion and a movable portion.

TECHNOLOGICAL BACKGROUND

Watches are in particular known from the prior art of timepieces, which include on their dial movable elements for decorative use, for example kinematically connected to a horological movement included in said timepieces.

The horological movement is adapted to move the movable elements according to the current time in order to generate a decoration that changes over time.

However, these movable elements cannot be displaced at will by the user, and consequently cannot be used to personalise the aesthetic appearance of the timepiece according to the wishes of the user.

There is a need for the user to be able to modify the aesthetic appearance of a timepiece at any time, when he wishes.

SUMMARY OF THE INVENTION

The invention solves the aforementioned disadvantages by proposing a watch whose appearance can be modified according to the user's wishes.

To this end, the present invention relates to a watch comprising a dial including a fixed portion superimposed on a rotatable part including a surface on which are arranged areas with visual appearance different from each other. The fixed portion comprises at least one through opening emerging on at least one of the areas, the movable portion being kinematically connected to a control member so as to be rotated by actuating said control member and being configured so that when it is rotated, the areas of different visual appearance appear successively through the opening.

The user can thus, on the one hand, modify the appearance of the dial of the watch by choosing the orientation of the movable portion so that the openings reveal areas with the desired visual appearances and, on the other hand, to obtain an attractive visual effect and an interactive decoration during the rotation of the movable portion.

In particular embodiments, the invention may further include one or more of the following features, taken alone or in all technically possible combinations.

In particular embodiments, the areas including the same visual appearance have an identical shape and dimensions, the fixed portion including at least two openings separated from each other by a bridge of material. Said openings and said bridge of material each substantially have a shape and dimensions corresponding to those of an area, and are distributed so that each of the openings can reveal only one area.

In particular embodiments, the areas are arranged in the shape of circular sectors adjacent to each other so that two successive circular sectors have a different visual appearance.

In particular embodiments, two successive areas have the same visual appearance, a bridge of material having a shape and dimensions corresponding to those of the pair formed by said two successive areas.

In particular embodiments, the movable portion includes a circular crown provided with a central orifice comprising an internal toothing in a meshing relationship with a toothed wheel adapted to be rotated by the control member.

In particular embodiments, the movable portion includes a circular crown provided with a central orifice, and includes a disc arranged in the central orifice of the circular crown. The disc and the circular crown are concentric, kinematically connected to the control member and each include areas with visual appearances different from each other.

In particular embodiments, the movable portion is kinematically connected to the control member so that the transmission ratios are such that the rotation of the movable portion is able to produce a movement blur of the areas visible through the openings.

In particular embodiments, the control member is formed by a crown stem connected to a crown.

In particular embodiments, the transmission ratios are chosen so that when the crown is pivoted by one turn, the movable portion is rotated by at least one turn.

In particular embodiments, the disc and the circular crown are meshed alternately by a sliding pinion, depending on the direction of rotation of the crown.

In particular embodiments, the watch comprises a system for holding the movable portion in position allowing it to be indexed according to at least one predefined position.

BRIEF DESCRIPTION OF THE FIGURES

Other features and advantages of the invention will appear upon reading the following detailed description given by way of non-limiting example, with reference to the appended drawings wherein.

DETAILED DESCRIPTION OF THE INVENTION

Figure 1:
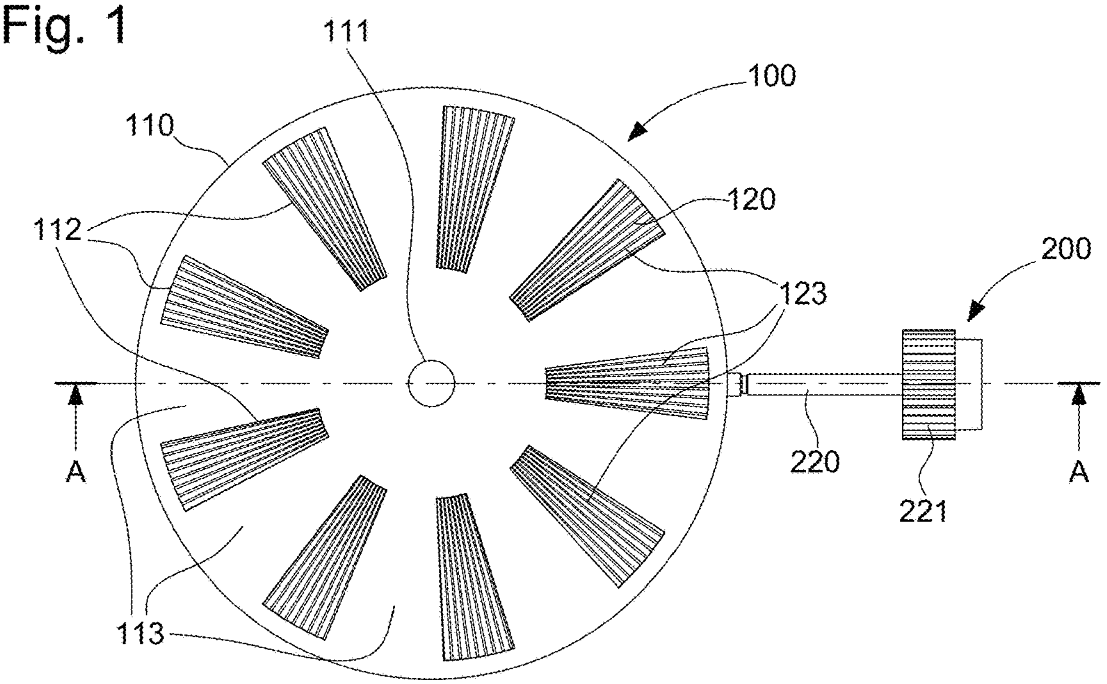
FIG. 1 shows a top view of a dial and a control member of a watch according to an exemplary embodiment of the invention.
Figure 2:
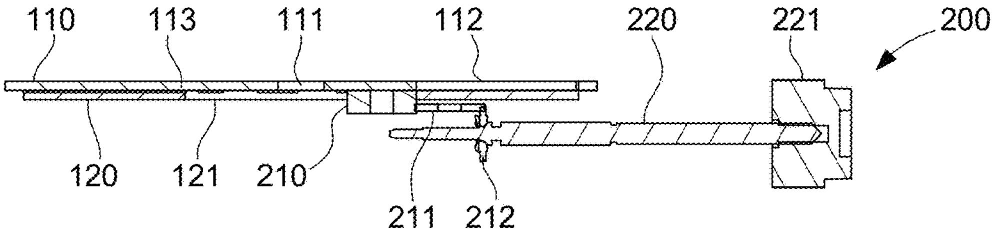
FIG. 2 shows a sectional view along the axis A-A of the dial and the control member of FIG. 1.
Figure 3:
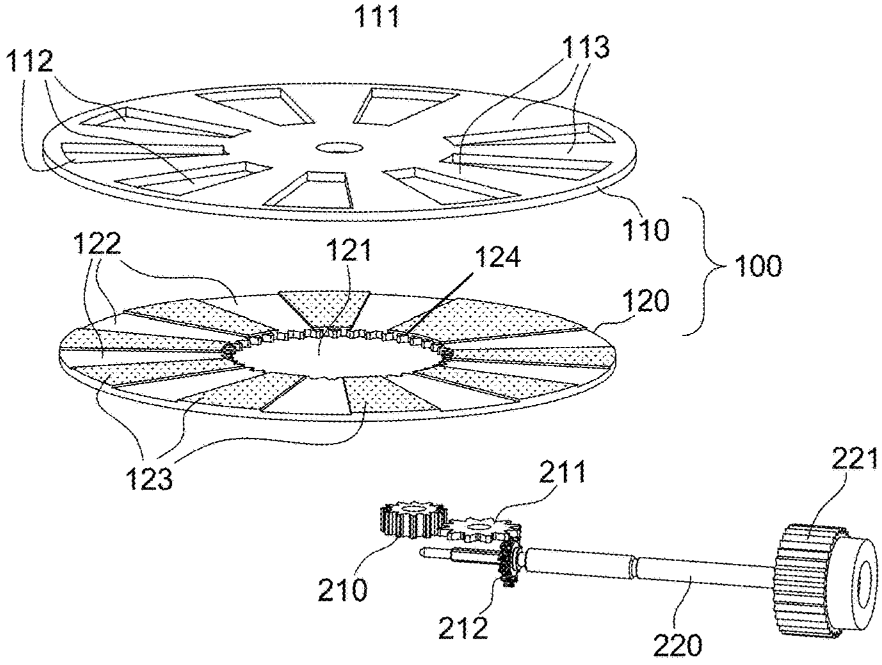
FIG. 3 shows an exploded perspective view of the dial and the control member of FIG. 1.

The present invention relates to a watch including a dial 100 and a control member 200 as shown in isolation in FIGS. 1 to 3.

The watch includes, in a manner known per se, a case composed of a middle part, a bezel and a back, said case forming an internal volume wherein is housed a horological movement intended to rotate the hands of the hours, minutes, and optionally seconds. The aforementioned constituent elements of the watch are not shown in the figures because they are known as such to the person skilled in the art and do not pertain as such to the present invention.

The dial 100 is arranged so as to be interposed between a crystal and the horological movement, in a manner known to the person skilled in the art.

The dial 100 according to the present invention includes a fixed portion 110 integral with the middle part, the bezel or the horological movement, and superimposed on a portion 120 movable in rotation connected kinematically to the control member 200, as shown in FIGS. 1 to 3, so as to be rotated by the actuation of said control member 200 by a user.

The fixed 110 and movable 120 parts are in the shape of thin planar parts and include concentric central orifices 111 and 121, through which cannons of the hands are intended to be engaged.

The movable portion 120 is capable of pivoting about an axis of rotation orthogonal to a plane defined by the fixed portion 110. For example, in the exemplary embodiment of the invention shown in FIGS. 1 to 3, the axis of rotation of the movable portion 120 is intended to coincide with the axis of rotation of the hands.

The movable portion 120 is, in the preferred embodiment shown in the figures, made in the shape of a circular crown and includes a surface on which are arranged areas 122 and 123 with visual appearance different from each other.

More particularly, as shown in the exploded view of FIG. 3, the areas 122 and 123 are distributed over the surface of the circular crown so as to divide it into a plurality of circular sectors adjacent to each other, two successive circular sectors having a different visual appearance.

Alternatively, the areas 122 and 123 may have other geometric shapes.

In the present text, the visual appearance can in particular be defined by the colour, the surface condition, for example the roughness of the surface, the presence of reliefs, the reflection of light, etc., and can be obtained by any means of decoration or machining within the reach of the person skilled in the art, such as depositing a coating, setting stones, surface finishing, such as polishing, etc.

The areas 122 and 123 can have, by way of example, two different aspects, shown in the exploded view of FIG. 3 by the presence or absence of radial grooves. Alternatively, it is possible to provide more areas with appearance different from each other.

The fixed portion 110 is, in the preferred embodiment shown in the figures, made in the shape of a disc and comprises at least one through opening 112 emerging on at least one of the areas 122 or 123 so that the latter are visible to a user, and so that when the movable portion 120 is rotated, the areas 122 and 123 appear successively opposite the opening 112. By way of example, in FIG. 1 the openings 112 reveal the areas 123 including radial grooves.

Advantageously, and as described in more detail in the following text, the movable portion 120 is kinematically connected to the control member 200 so as to promote the rotation of the movable portion 120 at a substantially high speed, which allows, by the successive appearances of areas 122 and 123 of different visual appearances, through the openings 112, so as to generate a particular optical effect characterised by a movement blur. This movement blur due to a phenomenon of retinal persistence, allows to generate an attractive interactive decoration on the dial 100, visible through the openings 112.

Furthermore, the invention allows to personalise the dial 100 in so far as the user can choose which areas 122 or 123 to leave visible through the openings 112. In other words, the user can, by stopping the rotation of the movable portion 120, choose what visual appearance to give to the dial 100.

It is seen here that the present invention has a double aesthetic interest. Indeed, the invention allows on the one hand to generate an interactive decoration during the displacement of the movable portion 120, and on the other hand, to hold in position, in a certain angular position, said movable portion 120, in order to display, through the openings 112, areas 122 or 123 having a visual appearance chosen by the user, to personalise the appearance of the watch.

In the embodiment of the invention shown in FIGS. 1 to 2, wherein the fixed portion 110 includes a plurality of openings 112, the latter are separated from each other by a bridge of material 113. Each opening 112 and the or each bridge of material 113 preferably respectively substantially have a shape and dimensions corresponding to those of an area 122 or 123, and are distributed so that the openings 112 can reveal only the areas 122 or 123 having the same visual appearance.

This arrangement advantageously allows the user to further personalise the aesthetic appearance of the watch.

In the exemplary embodiment of the invention illustrated in the figures, the fixed portion 110 has as many openings 112 as areas 122 or 123 having the same visual appearance.

Advantageously, it is possible, in an embodiment of the invention shown in FIG. 3, that two successive areas 122 or 123 have the same visual appearance, and that a bridge of material 113 has a shape and dimensions corresponding to those of the pair formed by said two successive areas 122 or 123. In this exemplary embodiment, the movable portion 120 and the fixed portion 110 have an odd number of areas 122 and 123 and openings 112 respectively.

This feature allows the user, by choosing the angular position of the movable portion 120, to be able to display through the openings 112 areas 122 and 123 having different visual appearances, each opening 112 showing only a single area 122 or 123.

It is understood here that the advantage of this feature relates to the aspect relating to the personalisation of the visual appearance of the dial 100.

In the exemplary embodiment shown in the exploded view of FIG. 3, the central orifice 121 of the circular crown comprises internal toothing 124 in a meshing relationship with a drive wheel 210 adapted to be rotated by the control member 200.

More specifically, the drive wheel 210 meshes with an intermediate wheel 211 engaged with a transmission pinion 212 connected to the control member 200.

In this exemplary embodiment of the invention, the control member 200 is formed by a crown rod 220 to which is fixed the transmission pinion 212 and comprising a crown 221 at one of its ends. The pivoting of the crown 221 causes, through the transmission pinion 212, the rotation of the intermediate wheel 211, which causes the rotation of the drive wheel 210 and therefore the rotation of the movable portion 120.

It is understood here that the direction of rotation of the movable portion 120 depends on the direction of rotation of the crown 221.

These features advantageously allow, by choosing adapted transmission ratios and according to the speed of rotation of the crown 221, to rotate the movable portion 120 at sufficiently high rotation speeds to produce, by the alternating and rapid appearance of areas 122 and 123 of different aspects through the openings 112, a movement blur.

As an indication, the transmission ratios can be chosen so that when the crown 221 is pivoted by one turn by the user, the movable portion 120 is pivoted by at least one turn. Thus, the tangential speed of the movable portion 120, for example at a point on its periphery, is always considerably higher than that of the crown 221, due to the significant difference between the values of their respective radii. This feature promotes and facilitates the appearance of the movement blur.

Advantageously, the present invention moreover allows to easily control the angular positioning of the movable portion 120 in order to be able to select a visual appearance to be displayed by moving the movable portion 120 so as to reveal the desired areas 122 or 123 opposite the openings 112.

As such, the watch may include a system 500 for holding the movable portion 120 in position (shown in FIG. 4) allowing it to be indexed according to one or more predefined angular positions.

By way of example, the position holding system can be formed by a jumper fixed by one of its ends to the middle part, to the bezel or to the horological movement. The jumper includes at its other end a tooth intended to be engaged into a notch made on the periphery of the movable portion 120.

More specifically, the movable portion 120 includes several notches regularly distributed over its periphery, and separated from each other by an angle corresponding to the angle separating two successive areas 122 and 123, so that in each predefined angular position capable of being occupied by the movable portion 120, the openings 112 each reveal a single area 122 or 123.

Figure 4:
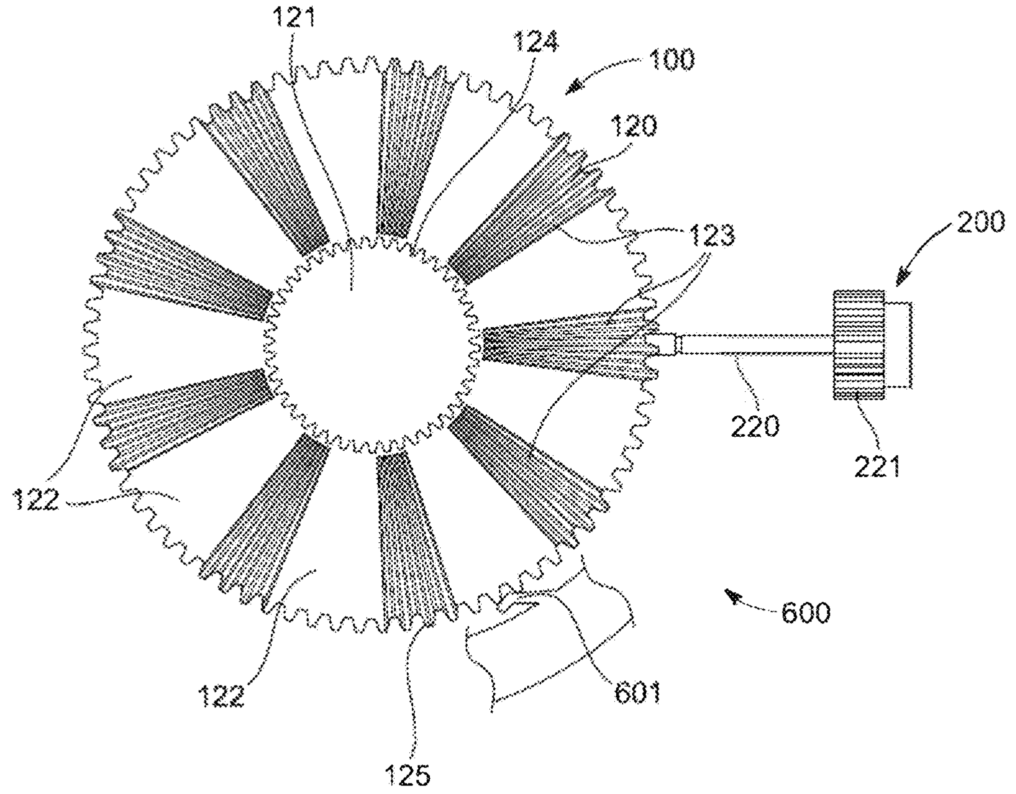
FIG. 4 shows a perspective view of a dial and a control member of a watch according to another exemplary embodiment of the invention.
Figure 5:
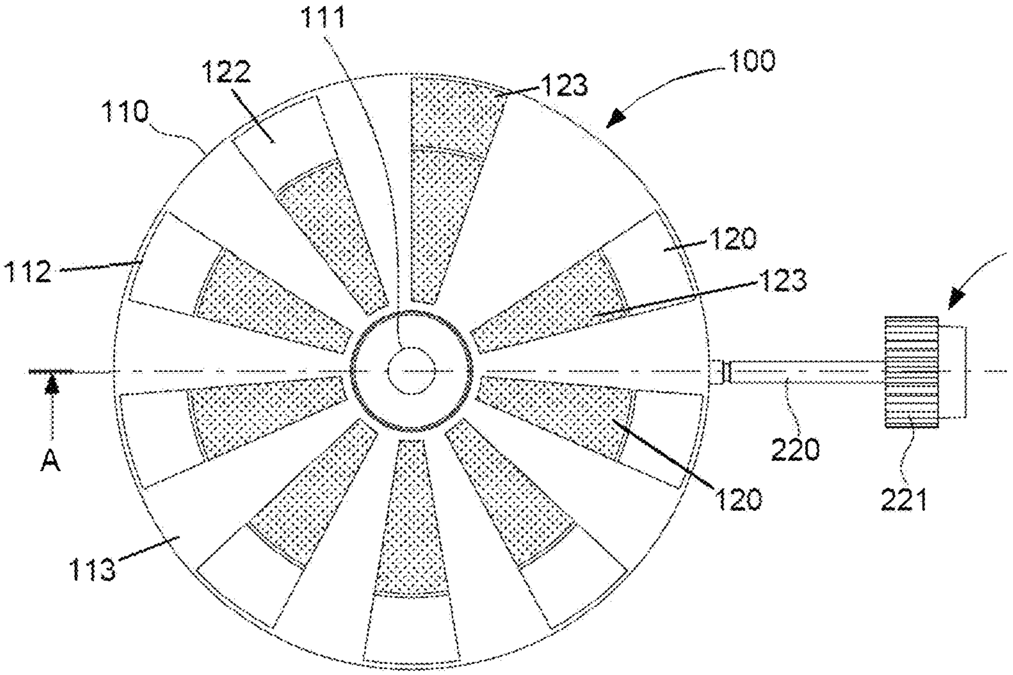
FIG. 5 shows a top view of a dial and a control member of a watch according to another exemplary embodiment of the invention.

In another exemplary embodiment shown in FIG. 4, the movable portion 120 includes two movable elements, including a circular crown 300 provided with a central orifice 321 and a disc 400 with a diameter less than the diameter of the central orifice 321, arranged inside said central orifice 321, said disc 400 and said circular crown 300 being concentric and both connected kinematically to the control member 200.

In particular, the disc and the circular crown can be meshed alternately by a sliding pinion, depending on the direction of rotation of the crown 221.

More particularly, the disc may include a toothing, for example external toothing, in a meshing relationship with a first drive wheel and the crown 221 may include a toothing, for example internal toothing, in a meshing relationship with a second drive wheel.

The first and second drive wheels can be arranged so as to be alternately engaged with the sliding pinion, which is for example mounted on a lever, said sliding pinion also being meshed with the transmission pinion 212.

Thus, when the crown 221 is rotated in a first direction of rotation, the sliding pinion meshes with the first drive wheel and transmits the rotational movement of the crown 221 to the disc so that the latter pivots, and when crown 221 is rotated in a second direction of rotation, the sliding pinion engages with the second drive wheel and transmits the rotational movement of the crown 221 to the circular crown so that it rotates.

Moreover, this arrangement with a sliding pinion allows to act as a clutch mechanism in the kinematic chain connecting the control member 200 and the movable portion 120 when the latter is rotated. Indeed, the sliding pinion allows to separate the control member 200 and the movable portion 120 so that when it is moving, the movable portion 120 does not drive the control member 200.

Thus, the control member 200 being always driving and not being able to be driven, the risk of damage to the parts transmitting forces between the movable portion 120 and the control member 200 is avoided. For example, such a risk may arise if the control member 200 is blocked while the movable portion 120 is still moving.

The design allowing to choose the direction of rotation of the disc and that of the circular crown is within the reach of the person skilled in the art, for example by adding or removing a toothed wheel in the gear train considered.

It is also possible, as an alternative, for the first and second drive wheels to be kinematically connected to each other, either by meshing directly with each other, or by means of one or more toothed wheels.

In another exemplary embodiment of the invention not shown in the figures, the control member 200 may be a push-piece connected to the drive wheel 210 by a mechanism for transforming a translation movement into a rotational movement.

The invention claimed is:

1. A watch comprising:

a dial wherein the watch includes a fixed portion superimposed on a portion movable in rotation including a surface on which are arranged wedge sectors that are adjacent to each other, the wedge sectors each including an upper surface having a first visual appearance or a second visual appearance, the first and second appearances being different from each other, the wedge sectors are arranged around the surface of the movable portion such that one of the wedge sectors with the first visual appearance is arranged adjacent to one of the wedge sectors with the second visual appearance so that each pair of successive wedge sectors have a different visual appearance from each other except for two of the wedge sectors that are adjacent each have the first visual appearance, the fixed portion comprising at least two through openings emerging respectively on at least one of the wedge sectors and being separated from each other by a first bridge of material, the movable portion being kinematically connected to a control member so as to be rotated by actuating said control member and being configured so that when the movable portion is rotated, the wedge sectors with the first and second visual appearances appear successively through the openings, said openings and said first bridge of material each substantially having a shape and dimensions corresponding to those of one of the wedge sectors of the first or second visual appearances, and being distributed so that each of the openings can reveal only one of the wedge sectors of the first or second visual appearances, except for one of the first bridges of material has a shape and dimensions corresponding to the two of the wedge sectors that are adjacent and each have the first visual appearance, wherein the movable portion includes a circular crown provided with a central orifice, and includes a disc arranged in the central orifice of the circular crown, the disc and the circular crown being concentric, kinematically connected to the control member and each including sectors with visual appearance different from each other, and wherein the control member is formed by a crown stem connected to a crown and wherein the disc and the circular crown are meshed alternately by a sliding pinion, depending on the direction of rotation of the crown.

2. The watch according to claim 1, wherein the movable portion is kinematically connected to the control member so that the transmission ratios are such that when the crown is pivoted by one turn, the movable portion is rotated by at least one turn.

3. The watch according to claim 1, comprising a system for holding the movable portion in position allowing it to be indexed according to at least one predefined position.

4. A watch comprising:

a dial wherein the watch includes a fixed portion superimposed on a portion movable in rotation including a surface on which are arranged wedge sectors that are adjacent to each other, the wedge sectors each including an upper surface having a first visual appearance or a second visual appearance, the first and second appearances being different from each other, the wedge sectors are arranged around the surface of the movable portion such that one of the wedge sectors with the first visual appearance is arranged adjacent to one of the wedge sectors with the second visual appearance so that each pair of successive wedge sectors have a different visual appearance from each other except for two of the wedge sectors that are adjacent each have the first visual appearance, the fixed portion comprising at least two through openings emerging respectively on at least one of the wedge sectors and being separated from each other by a first bridge of material, the movable portion being kinematically connected to a control member so as to be rotated by actuating said control member and being configured so that when the movable portion is rotated, the wedge sectors with the first and second visual appearances appear successively through the openings, said openings and said first bridge of material each substantially having a shape and dimensions corresponding to those of one of the wedge sectors of the first or second visual appearances, and being distributed so that each of the openings can reveal only one of the wedge sectors of the first or second visual appearances, except for one of the first bridges of material has a shape and dimensions corresponding to the two of the wedge sectors that are adjacent and each have the first visual appearance, wherein the control member is formed by a crown stem connected to a crown, and wherein the movable portion is kinematically connected to the control member so that the transmission ratios are such that when the crown is pivoted by one turn, the movable portion is rotated by at least one turn.

5. The watch according to claim 4, wherein the movable portion includes a circular crown provided with a central orifice comprising an internal toothing in a meshing relationship with a toothed wheel adapted to be rotated by the control member.

* * * * *